July 14, 1936.  H. TRAMM ET AL  2,047,397
APPARATUS FOR THE THERMIC TREATMENT OF GASES
Filed Nov. 9, 1932   3 Sheets-Sheet 1
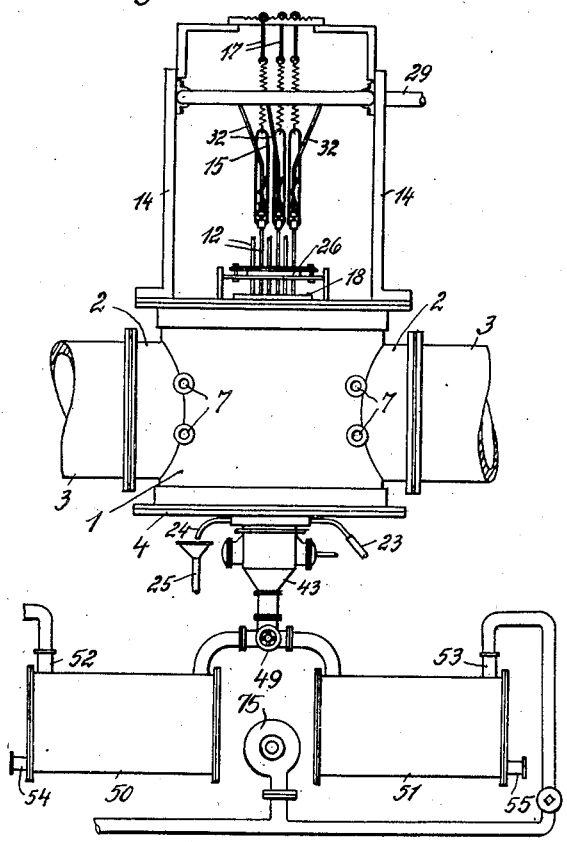
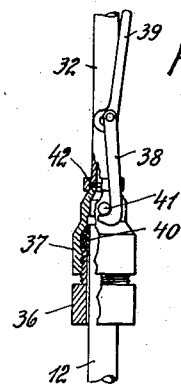
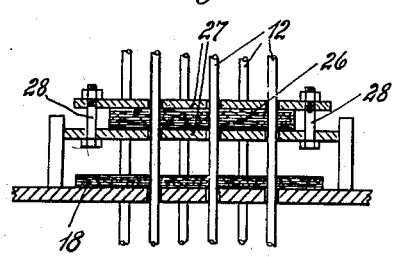
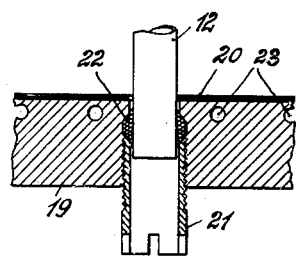
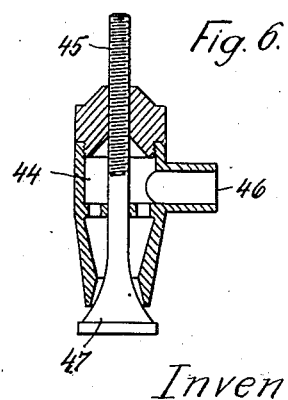
Inventors:
Heinrich Tramm
and Reinhard Jung
by Karl Michaelis
Atty.

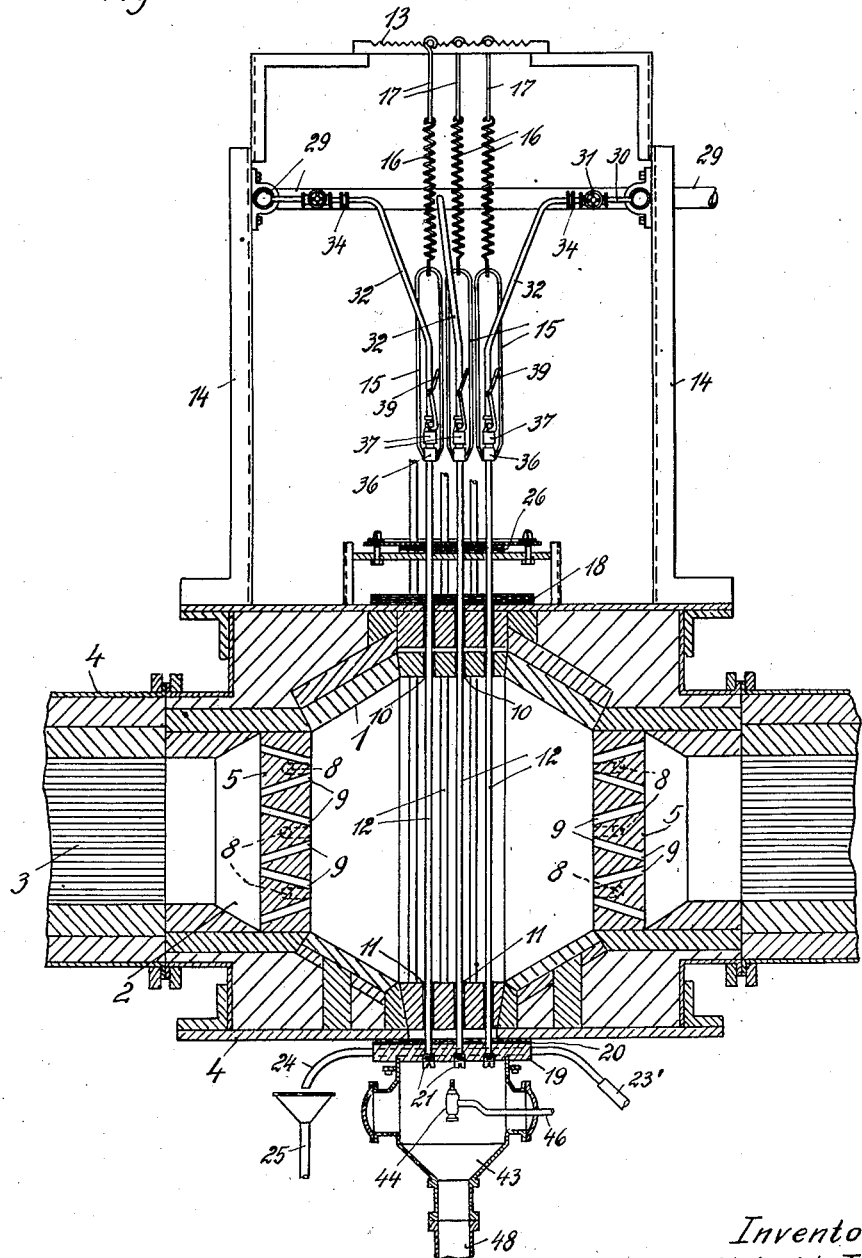

July 14, 1936.  H. TRAMM ET AL  2,047,397
APPARATUS FOR THE THERMIC TREATMENT OF GASES
Filed Nov. 9, 1932  3 Sheets-Sheet 3

Inventors:
Heinrich Tramm
and Reinhard Jung
by Karl Michaelis
Atty.

Patented July 14, 1936

2,047,397

UNITED STATES PATENT OFFICE 2,047,397

APPARATUS FOR THE THERMIC TREATMENT OF GASES

Heinrich Tramm and Reinhard Jung, Oberhausen-Holten, Germany, assignors to Ruhrchemie Aktiengesellschaft, Oberhausen-Holten, Germany Application November 9, 1932, Serial No. 641,888
In Germany November 11, 1931

17 Claims. (Cl. 23—277)

Our invention relates to gas reactions and more especially to means whereby the thermic treatment of gases can be carried through with particular ease and high efficiency. It is quite particularly concerned with thermic processes occurring at high temperatures, for instance within the range of 1000 and 2000° C., which involve particular difficulties as regards the material constituting the reaction chambers and the connections between the different parts of the apparatus.

It is an object of our invention to provide means for carrying the heat treatment through at high temperatures in narrow conduits or tubes of ceramic material and notwithstanding the brittleness of such material, to provide for a solid and gastight connection between the several parts.

The apparatus forming the principal object of our invention is designated in the first line for the thermic decomposition of hydrocarbons, such as for instance methane and the recovery of valuable products, such as acetylene, benzene and the like.

As is well known to those skilled in the art, the carrying through of gas reactions at high temperatures ranging for instance between 1000° and 2000° C. encounters extraordinary difficulties, more especially as far as the introduction of the necessary heat energy into the gas or gases and the abduction of heat therefrom is concerned. All these reactions are known to occur in the desired sense only within comparatively narrow limits of temperature and the temperatures of reaction are as a rule very high, so that it becomes necessary to heat the gases up to this temperature as quickly as possible and to control the temperature as perfectly as possible to keep it constant. The nature of the material used in the construction of the reaction vessel plays a conspicuous role since gas reactions are greatly influenced by the catalytic properties of such materials. Metals, such as iron, steel and copper, and their alloys are known to react at high temperatures with gas containing oxygen or carbon, forming oxides and carbides, respectively, and to be thus subjected to corrosion and partial destruction, while on the other hand the gas reactions are unfavorably influenced thereby. It has been tried repeatedly to replace the metals by bricks or other ceramic material, however, the necessity of avoiding any heat accumulation and of subdividing the zone of reaction as far as possible renders the use of the normal type of ovens impossible, the more so as in many cases the thermic treatment must be carried through at pressures below atmospheric, for instance from 0.2 to 0.5 atms. It is quite particularly the porosity of ceramic materials which renders them unfit for such uses, since it is impossible to make them gastight and to avoid losses. On the other hand the large inner surface area of porous materials is liable to influence the reactions by catalytic action.

We have found that the problem confronting us can only be solved successfully by means of a reaction chamber subdivided into a great number of units, each of which is constituted by a tube made of a ceramic material which is impervious to gases even at the high temperatures here in question and which presents an unbroken poreless surface. We have found sintered alumina or masses containing alumina or aluminium silicates to be particularly adapted for this purpose, and tubes made from such material have been found useful which were 1500 mms. long and had an inner diameter of 15 mms. and a wall thickness of 2 mms. A plurality of such tubes is combined to form an oven which is heated from without, preferably by the regenerative or recuperative system.

In order to obviate the difficulties arising from the comparative brittleness of these materials we have found it useful to connect the ends of the tubes with the supply and exhaust mains by movable and nevertheless gastight connections.

These and other details of our invention will now be described, reference being had to the drawings affixed to this specification and forming part thereof, in which two forms of apparatus embodying our invention are illustrated diagrammatically by way of example.

In the drawings

Fig. 1 is a diagram showing the general design of the first modification, while

Fig. 2 is a vertical axial section of the oven shown in Fig. 1 drawn to a larger scale.

Figure 7:
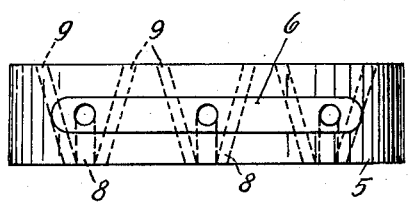

Fig. 3 is an axial section, drawn to a still larger scale, of one of the tube suspensions and couplings, Fig. 4 is a similar view of the means for movably packing the tubes at the points where they enter the oven, Fig. 5 is an axial section of a bottom end packing, Fig. 6 is a similar view of the sprinkling nozzle in the gas exhaust, Fig. 7 is an elevation of the member in which the gas and air nozzles are formed.

Figure 8:
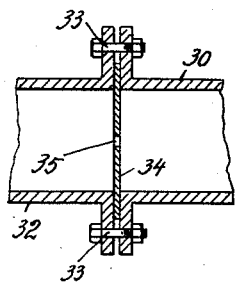
Figure 9:
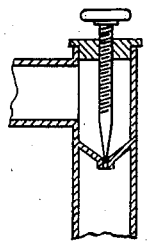

Fig. 8 is an axial section of a choke valve inserted in one of the pipes which connect the reaction tubes with the supply main, and Fig. 9 is a similar view of a needle valve which may be used instead of the choke valve shown in Fig. 8.

Figure 10:
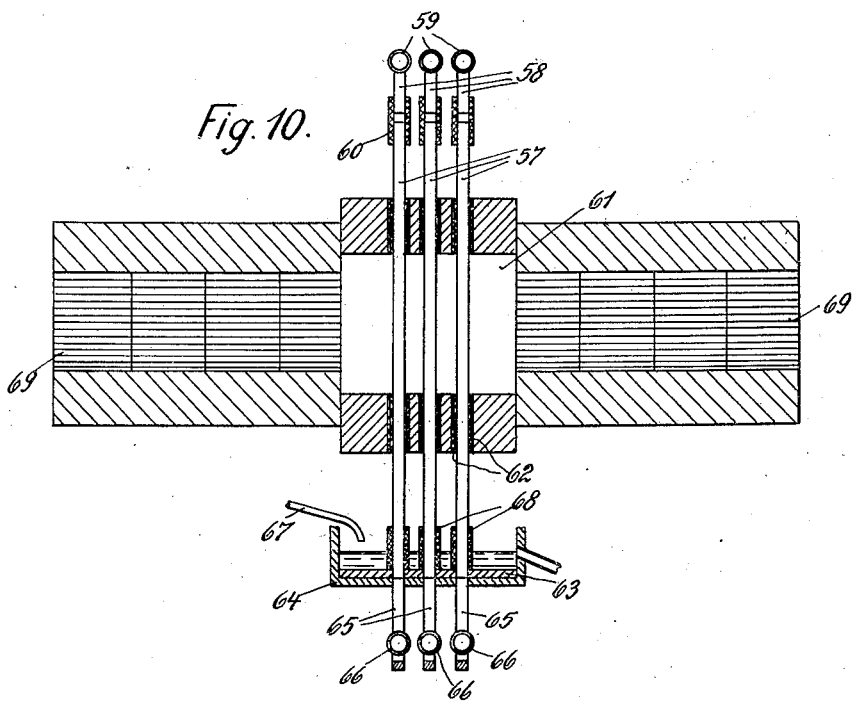

Fig. 10 is a diagram of another modification of the oven.

Referring to the drawings, 1 is the combustion chamber of the oven proper and 2, 2 are lateral extensions connecting same with regenerators 3, 3 of some suitable type, set out with the usual chequer work or the like, these parts being made of ceramic material of the usual kind, such as chamotte, silica bricks or the like and enclosed in an iron shell 4. 5, 5 are nozzle members inserted in the extensions 2, these members being formed with one or a plurality of circumferential grooves 6 supplied with combustible gas through inlet ports 7 in the wall of the oven 1 and feeding a number of axial gas nozzles 8, to each of which are apportioned converging air nozzles 9 leading from the regenerators 3 to the interior of the oven. The manner of operating the combustion of the gas in the oven with the air preheated alternately in one and the other regenerator is the usual one and need not be described in detail.

The top and bottom of the oven proper are formed with rows of perforations 10 and 11, six rows being shown in Fig. 2 by way of example and adjoining rows being staggered relative to each other. Through these perforations extend six rows of reaction tubes 12, each of which may for instance be 1200 mms. long and may be formed with an inner diameter of 10 mms. and an outer diameter of 15 mms. These tubes are formed of a material which is impervious to gases even at the higher temperatures here in question, such as sintered alumina or a sintered mass containing alumina or an aluminium silicate. Other masses having the same characteristic properties may be used as well in the construction of these tubes. The tubes are preferably freely movable in the perforations 10 and 11, the escape of gases of combustion through the perforations being prevented by suitable packings to be described hereinafter. Each tube is freely suspended from a cross beam 13 supported by standards 14 mounted above the oven, a strap 15 gripping the top end of the tube being connected to the end of a coil spring 16, the other end of which is fixed to a strap 17 embracing the beam. This suspension of the tubes provides for expansion and contraction due to changes of temperature and for shocks, which might work damage to the brittle tube material.

The packing provided on top of the oven and serving to seal the tubes in the perforations 10 in a gastight manner is formed of a number of superposed layers 18 of a material such as asbestos. The bottom ends of the tubes are sealed with respect to the bottom of the oven by means of a perforated plate 19 formed, on the side facing the oven, with a heat resistive coating 20. The tubes are sealed in the perforations of this plate by means of stuffing boxes 21 having the form of threaded sleeves acting on annular layers 22 of some suitable heat resistive sealing material, such as asbestos or the like. The plate is traversed by conduits 23 extending in parallel to its top and bottom surfaces and cooling water is supplied to these conduits by pipes 23' and allowed to escape through pipes 24 into channels 25.

Some distance above the top seal 18 are arranged a number of superposed asbestos plates 26 inserted between metal plates 27 and held between them under pressure. The tubes 12 are held in perforations traversing the plates 26 and 27 by the screw bolts 28. This device serves for damping oscillations of the tubes which may arise during their operation, while allowing them to expand and contract to a certain degree.

29 is the reaction gas supply main and 30 are branch pipes connected with the main and having ordinary valves 31 inserted therein. From each of these pipes a connecting pipe 32 extends down to the top end of a tube 12. The pipes 30 and 32 are connected by screw bolts 33 traversing their flanged ends, and between these ends are inserted throttle or choke valves, which in the modification illustrated in Fig. 8 may be formed of thin metal plates 34 formed with a narrow perforation 35.

Instead of the perforated plates 34 needle valves, for instance of the kind illustrated in Fig. 9, may be provided. These valves are designed to provide for a constant passage of gas through the pipes and into the tubes regardless of slight variations of pressure in the gas main 29.

Each pipe 32 is gastightly connected with the top end of a tube 12 by means of a coupling, such as shown more in detail in Fig. 3, where 12 is the tube, 32 the connecting pipe, 36 an outwardly threaded sleeve fixed to the top end of tube 12, 37 a cap embracing the sleeve 36 and forming with it a stuffing box, suitable sealing material 40 being inserted between the parts. 38 is a hook pivoted eccentrically to a lever 39 which is pivoted to the connecting pipe 32. The hook 38 grips a pin 41 fixed to the cap 37 and is pulled upwardly by the eccentric lever 39, thereby forcing the top end of the cap 37 against the bottom end of the connecting pipe 32, a packing ring 42 being inserted between the parts. The connecting pipe can thus be readily connected with and disengaged from the tube 12 appertaining to it. The strap 15 is fixed to the sleeve 36.

Below the bottom plate 19 is secured a casing 43, in the centre of which is mounted a sprinkler head 44 supplied with water from a pipe 46. As shown in Fig. 6, this sprinkler head may be formed of a sleeve, through which extends a threaded spindle 45, the conically enlarged bottom end 47 of which extends through the bottom opening of sleeve 44, leaving an annular conical passage for the water, which is thus allowed to escape into the casing 43 in the manner of a shower. 48 is a pipe in which is inserted a three-way cock 49, to which are connected two receivers 50, 51 (Fig. 1) which can be alternately connected to a vacuum pump 75 at 52 and 53, respectively, while liquid may be tapped at 54, 55, respectively.

If it is for instance desired to employ this apparatus in the thermic treatment of methane for the production, by decomposition at high temperature, of acetylene, the oven 1 is heated to a temperature which may vary between limits such as 1200 and 1800°, by passing through it combustible gases introduced through the nozzles 7 and air introduced through one of the regenerators 3, the combustion of the gas taking place in the heating chamber 1. When the temperature required for the reaction and which depends from the velocity at which the methane is passed through the tubes 12, has been attained, the vacuum pump 75 is started and connected with one of the receivers 50, 51, whereby methane gas is sucked from the main 29 through the collecting pipes 32, the tubes 12 and the sprinkler casing 43. The pressure acting on the methane in the main 29 and the vacuum created in the receiver 50 or 51 are so regulated that the velocity at which the methane passes through the reaction tubes 12, is adjusted for the temperature prevailing in the tubes, it being well known that the decomposition of methane into acetylene without any undue separation of free carbon requires the period of heating of the gas to be limited to fractions of a second and within the range of temperature mentioned above to about 0.01 to 0.0005 second.

In the casing 43 the reacted gas mixture is collected and cooled by the water or other liquid, such as thinly fluid tar or the like issuing from the sprinkler head 44, which also serves for precipitating any solid matter, such as carbon, carried away by the gases.

The water, tar or other liquid is separated from the gases in the receiver 50 or 51, whichever happens to be connected to the casing 43. The gas escapes at 52 or 53, while the liquid can be tapped off at 54 or 55, after the receiver has been disconnected by means of the cock 49. Before connecting it again to the casing 43, the emptied receiver is evacuated in order to prevent undue variations of pressure from arising in the reaction tubes.

In the modified apparatus illustrated in Fig. 10, the reaction tubes 57 are connected with their cooled top ends to the connecting branch pipes 58 of the gas mains 59 by means of rubber sleeves 60 and are packed in perforations of the top and bottom of the heating chamber 61 by means of asbestos packings 62. The bottom ends of the tubes 57 extend into perforations of a rubber plate 63 arranged on the bottom of a water basin 64 into which extend from below metal tubes 65 leading to the exhaust mains 66. The basin is supplied with water from a pipe 67 and sleeves 68 of a heat resistive absorbent material, such as asbestos surround the bottom ends of the tube 57, acting like wicks to cool the tubes at these points. The tubes 57 may be formed of sintered alumina or the like, or of porcelain etc. The heating chamber 61 of the oven is supplied with air through one of the regenerators 68. Owing to the elastic connection inserted between the top end of the tubes 57 and the connecting pipes 58, the tubes may expand and contract freely.

Obviously, instead of resorting to the regenerative system of heating, any other heating system may be used for raising the interior of the reaction tubes to the temperature required in each individual case.

The inner diameter of the reaction tubes will be chosen in accordance of the requirements of each individual case. For instance, if methane shall be decomposed for the formation of acetylene and other hydrocarbons richer in carbon, the tubes may be 1200 mms. long and have an inner diameter of 10 mms. and an outer diameter of 15 mms., two thirds of each tube being disposed within the heating chamber. If the gas is heated in these tubes to a temperature of 1600° and is passed through the tubes under a pressure of 40 mms. mercury column, about 400 litres methane can be heat-treated in each tube per hour, 60 to 65% of the gas being converted into acetylene, practically no free carbon being separated.

The apparatus here described is by no means limited to the decomposition of methane, but may for instance also be employed when converting methane into benzene and tar hydrocarbons. This reaction is preferably effected at atmospheric pressure and a temperature of from 1000 to 1200° C., the period of heating of each gas particle being limited to below one second.

The apparatus here described is further adapted for the carrying out of reactions which are furthered by catalytic action, for instance when acting upon hydrocarbons with oxygen or oxygenated compounds for the production of water gas. In this case the contact mass adapted for the purpose in view is arranged in the tubes, which are heated to about 800° C. Metallic nickel distributed on a refractory carrier material may for instance be useful in connection with this process. Here also the ceramic tubes are safe against any attack by the reaction gases and the temperature in the tubes can be nicely regulated by cooling or heating as required in each individual case.

The choke valves or nozzles mentioned above and which are illustrated by way of example in Figs. 8, and 9, must also be chosen in accordance with the reaction occurring in the tubes and the pressure acting on the gas. For instance, if methane is converted into acetylene under a vacuum of 50 mms. mercury column in tubes having an inner diameter of 10 mms. and an outer diameter of 15 mms., 800 mms. of each tube being disposed in the heating zone, the diameter of the gas passage, such as 35, in these valves is preferably chosen between 1.5 and 2.5 mms. It has been found that clogging of the tubes is practically avoided by the insertion of these valves and a substantially constant output is obtained.

The springs 16 from which the tubes are suspended are preferably dimensioned in such manner that they are enabled to support the weight of each tube and its accessories and still exert a certain pull on the tube.

The damping devices, such as 26, consisting of layers of asbestos, felt or the like, have proved particularly useful in preventing oscillations from arising in the tubes without preventing contraction and expansion.

We wish it to be understood that we do not desire to be limited to the exact details of construction shown and described for obvious modifications will occur to a person skilled in the art.

We claim:—

1. An apparatus for the thermic treatment of gases comprising a heating oven, a plurality of juxtaposed reaction tubes of a poreless ceramic material impervious to gas at high temperature extending freely through perforations in opposite walls of said oven and means for yieldingly packing said tubes relative to the oven walls thus allowing the tubes to expand and contract freely.

2. An apparatus for the thermic treatment of gases comprising a heating oven, a plurality of juxtaposed reaction tubes of a poreless ceramic material impervious to gas at high temperature extending freely through perforations in opposite walls of said oven and heat resistive means for yieldingly packing said tubes relative to the oven walls in such manner that the tubes are free to expand and contract.

3. An apparatus for the thermic treatment of gases comprising a heating oven, a plurality of juxtaposed reaction tubes of a poreless ceramic material impervious to gas at high temperature extending freely through perforations in opposite walls of said oven, means for yieldingly packing said tubes relative to the oven walls thus allowing the tubes to expand and contract freely, a supply main for the gas to be reacted in the tubes and means whereby the top end of each tube can be readily and gastightly connected to and disconnected from said supply main.

4. An apparatus for the thermic treatment of gases comprising a heating oven, a plurality of juxtaposed reaction tubes of a poreless ceramic material impervious to gas at high temperature extending freely through perforations in opposite walls of said oven and an elastic suspension for said tubes.

5. An apparatus for the thermic treatment of gases comprising a heating oven, a plurality of juxtaposed reaction tubes of a poreless ceramic material impervious to gas at high temperature extending freely through perforations in opposite walls of said oven, an elastic suspension for said tubes, a supply main for the gas to be reacted in the tubes and means whereby the top end of each tube can be readily and gastightly connected to and disconnected from said supply main.

6. An apparatus for the thermic treatment of gases comprising a heating oven, a plurality of juxtaposed reaction tubes of ceramic material impervious to gas at high temperature extending freely through perforations in opposite walls of said oven, a gas supply main and members formed of rubber for connecting the ends of said tubes to said supply main.

7. An apparatus for the thermic treatment of gases comprising a heating oven, a plurality of juxtaposed reaction tubes of ceramic material impervious to gas at high temperature extending freely through perforations in opposite walls of said oven, means for yieldingly packing said tubes relative to the oven walls, thus allowing the tubes to expand and contract freely, and means for cooling the longitudinally movable bottom ends of said tubes.

8. An apparatus for the thermic treatment of gases comprising a plurality of juxtaposed reaction tubes of ceramic material impervious to gas at high temperature freely extending through perforations in the oven walls, a heating oven surrounding the middle portions of said reaction tubes, a gas supply main, means for yieldingly packing said tubes relative to the oven walls, thus allowing the tubes to expand and contract freely, and liquid cooled means embracing the longitudinally movable bottom ends of said tubes.

9. An apparatus for the thermic treatment of gases comprising a plurality of juxtaposed reaction tubes of ceramic material impervious to gas at high temperature, a heating oven surrounding the middle portions of said reaction tubes, a gas supply main, a basin below the bottom ends of said tubes, a plate of resilient material surrounding said bottom ends, means for supplying cooling liquid to said basin and sleeves of absorbent material surrounding the bottom ends of said tubes and extending into the liquid in said basin.

10. An apparatus for the thermic treatment of gases comprising a plurality of juxtaposed reaction tubes of a material impervious to gas at high temperature freely extending through perforations in the oven walls, and elastic suspension for said tubes, a heating oven surrounding the middle portions of said reaction tubes, means for yieldingly packing said tubes relative to the oven walls, thus allowing the tubes to expand and contract freely, a gas supply main above said tubes, pipes connecting said tubes to said gas supply main and eccentric locking means for connecting said tubes with said pipes in a gastight manner.

11. An apparatus for the thermic treatment of gases comprising a heating oven, a plurality of juxtaposed reaction tubes of a material impervious to gas at high temperature extending freely through perforations in opposite walls of said oven, and damping means resiliently embracing said tubes above their middle portions.

12. An apparatus for the thermic treatment of gases comprising a heating oven, a plurality of juxtaposed reaction tubes of a material impervious to gas at high temperature extending freely through perforations in opposite walls of said oven, means for yieldingly packing said tubes relative to the oven walls, thus allowing the tubes to expand and contract freely, a collector casing into which extend the bottom ends of said tubes and liquid cooling means in said casing.

13. An apparatus for the thermic treatment of gases comprising a heating oven, a plurality of juxtaposed reaction tubes of a material impervious to gas at high temperature extending freely through perforations in opposite walls of said oven, means for yieldingly packing said tubes relative to the oven walls, thus allowing the tubes to expand and contract freely, a collector casing into which extend the bottom ends of said tubes and means in said casing for spraying a cooling liquid into the gases to cool them directly.

14. An apparatus for the thermic treatment of gases comprising a heating oven, a plurality of juxtaposed reaction tubes of a material impervious to gas at high temperature extending freely through perforations in opposite walls of said oven, a collector casing into which extend the bottom ends of said tubes, means for yieldingly packing said tubes relative to the oven walls, thus allowing the tubes to expand and contract freely, and means connected with said collector casing for creating a vacuum in said reaction tubes.

15. An apparatus for the thermic treatment of gases comprising a heating oven, a plurality of juxtaposed reaction tubes of a material impervious to gas at high temperature extending freely through perforations in opposite walls of said oven, means for yieldingly packing said tubes relative to the oven walls, thus allowing the tubes to expand and contract freely, a collector casing into which extend the bottom ends of said tubes, means in said casing for spraying a cooling liquid into the gases to cool them directly, a pair of receivers connected with said casing, means for alternately connecting one and the other receiver with said tubes and means for alternately evacuating one and the other receiver.

16. An apparatus for the thermic treatment of gases comprising a heating oven, a plurality of juxtaposed reaction tubes of a material impervious to gas at high temperature extending freely through perforations in opposite walls of said oven, means for yieldingly packing said tubes relative to the oven walls, thus allowing the tubes to expand and contract freely, a regenerator on either side of said oven, a nozzle member inserted between each regenerator and said oven, converging air nozzles extending through said member in the direction of the oven axis and gas nozzles extending between said air nozzles.

17. An apparatus for the thermic treatment of gases comprising a plurality of juxtaposed reaction tubes of ceramic material impervious to gas at high temperature, a heating oven surrounding the middle portions of said reaction tubes, a perforated plate adapted to act as a stuffing box packing the oven chamber against the atmosphere, a collector casing closed by said plate, the bottom ends of said tubes extending through and being packed by said plate, means for passing a cooling medium through said plate to cool the bottom ends of said tubes and means in said collector casing for spraying a cooling liquid into the gases to cool them directly.

HEINRICH TRAMM.
REINHARD JUNG.